United States Patent
Bronzino et al.

(10) Patent No.: US 8,251,374 B2
(45) Date of Patent: Aug. 28, 2012

(54) POWER-OPERATED CHUCK

(75) Inventors: Walter Bronzino, Turin (IT); Pier Mauro Bronzino, Turin (IT)

(73) Assignee: SMW-Autoblok Spannsysteme GmbH (DE)

( * ) Notice: Subject to any disclaimer, the term of this patent is extended or adjusted under 35 U.S.C. 154(b) by 1020 days.

(21) Appl. No.: 12/283,470

(22) Filed: Sep. 12, 2008

(65) Prior Publication Data

US 2009/0102144 A1  Apr. 23, 2009

(30) Foreign Application Priority Data

Sep. 27, 2007 (EP) .................................. 07018989

(51) Int. Cl.
- *B23B 31/175* (2006.01)
- *B23B 31/177* (2006.01)
- *B23B 31/18* (2006.01)

(52) U.S. Cl. .................. 279/119; 279/121; 279/106

(58) Field of Classification Search .................. 279/110, 279/120, 121, 123, 119, 106, 108, 157
See application file for complete search history.

(56) References Cited

U.S. PATENT DOCUMENTS

| | | | | |
|---|---|---|---|---|
| 2,830,823 A * | 4/1958 | Becker | ............................ | 279/110 |
| 3,233,908 A | 2/1966 | Schwarzmayr et al. | | |
| 3,560,010 A * | 2/1971 | Hohwart | ........................ | 279/123 |
| 3,767,219 A * | 10/1973 | Fischer et al. | ................. | 279/106 |
| 4,000,907 A * | 1/1977 | Pascor | ............................ | 279/121 |
| 5,409,242 A * | 4/1995 | Gonnocci | ....................... | 279/106 |
| 6,454,278 B1 * | 9/2002 | Wrobel et al. | ................. | 279/130 |
| 6,634,652 B1 | 10/2003 | Wolff | | |
| 2008/0203681 A1 * | 8/2008 | Crowley et al. | ................ | 279/124 |

FOREIGN PATENT DOCUMENTS

| | | |
|---|---|---|
| EP | 0 251 266 | 1/1988 |
| EP | 0 686 449 | 12/1995 |
| JP | 01 135404 | 5/1989 |

\* cited by examiner

*Primary Examiner* — Daniel Howell
*Assistant Examiner* — Paul M Janeski
(74) *Attorney, Agent, or Firm* — Pandiscio & Pandiscio

(57) ABSTRACT

In a power-operated chuck (1) with radially adjustable clamping jaws (5) that are attached so as to swivel and be axially adjustable on an articulation lever arranged in a chuck body (2), each of the articulation levers (10) is pivotably mounted on an articulation pin (21) that passes through the articulation levers (10) and the articulation pins (21) are supported in the chuck body (2) so as to prevent rotation and are guided to permit limited axial movement.

Figure 1:
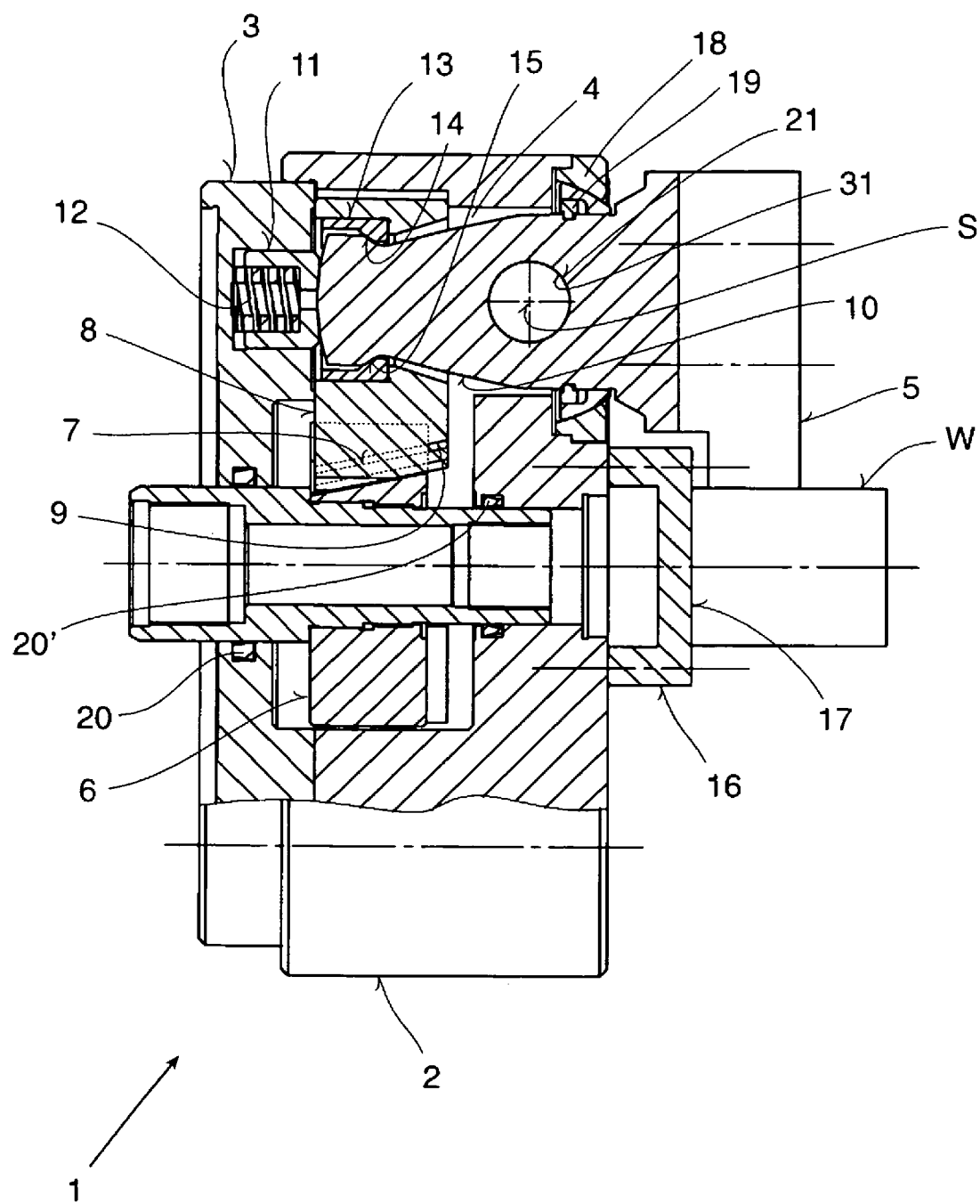

This embodiment makes it possible not only to carry out precise clampings of workpieces (W) over a long period with a consistently high level of rigidity, but also to avoid wear to a large extent. As a result, workpieces can always be clamped precisely whilst a high level of repeat accuracy is provided.

10 Claims, 4 Drawing Sheets

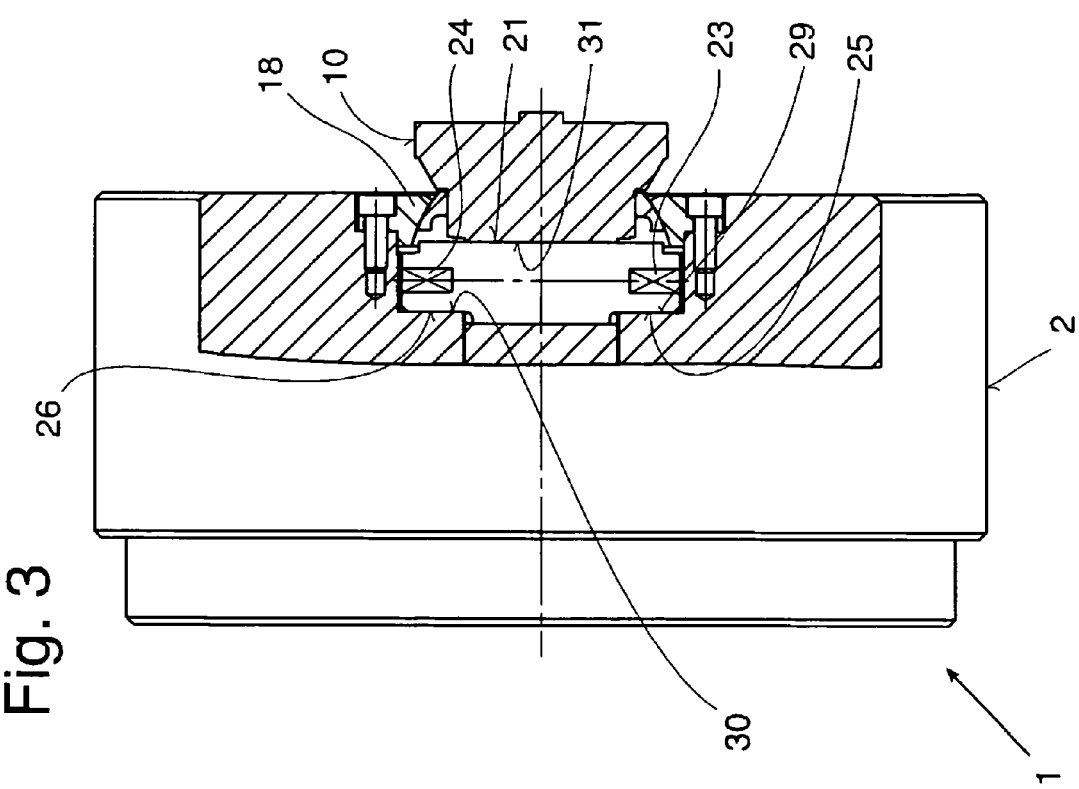
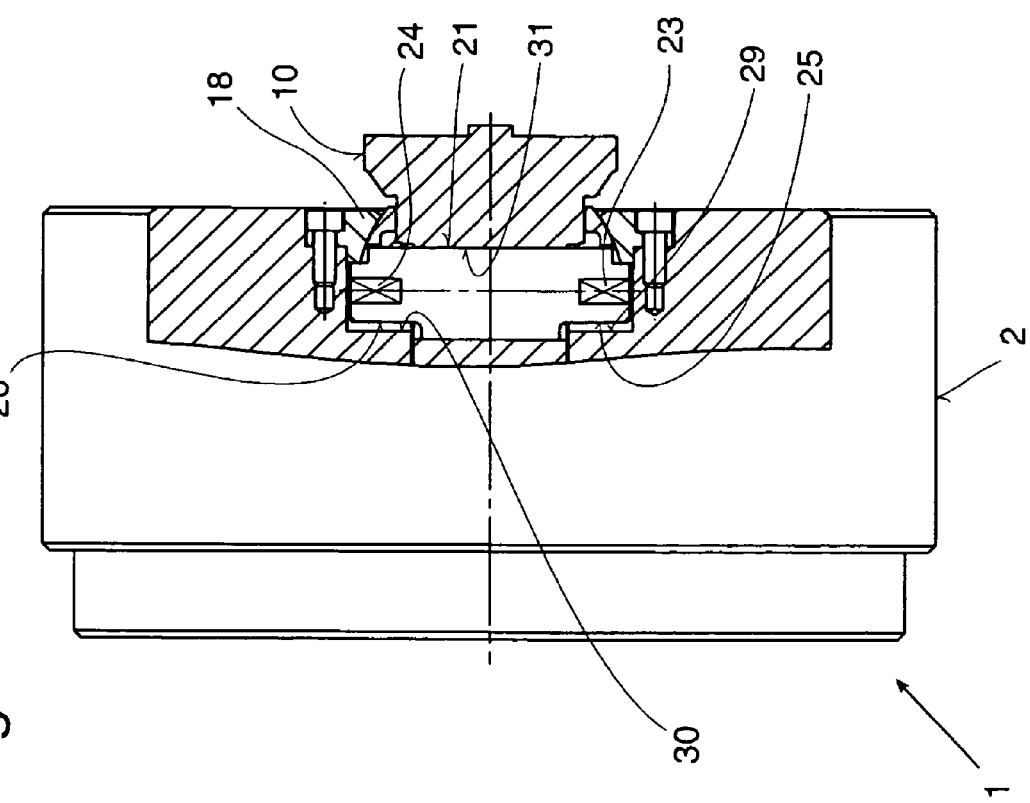

POWER-OPERATED CHUCK

The present invention relates to a power-operated chuck with two or more radially adjustable clamping jaws, each of which is attached to an articulation lever that is axially adjustable against the force of a spring and which is mounted in a chuck body and can swivel to a limited extent, in which case the articulation levers can be actuated by driving jaws acting on the ends of the articulation levers opposite to the clamping jaws with the driving jaws being influenced by an adjustment piston or the like by means of inclined surfaces, and in which case the chuck body has a contact surface for the workpiece to be clamped.

A power-operated chuck of this kind, also referred to as a hold-down chuck, is disclosed in European patent registration 0 251 266 A2. Each of the articulation levers in this embodiment is mounted in cylindrical openings worked into the chuck body and can swivel to a limited extent by means of a spherical outer jacket surface, and the axial adjustment travel of the articulation levers (which determines the hold-down effect of the power-operated chuck) can be adjusted by means of a pressure piece which is acted upon by spring force.

This means the articulation pins are supported on the cylindrical surfaces of the chuck body by means of the spherical surfaces, so that only linear contact between these components is provided in the clamped position. Even after a short time, therefore, there may be damage caused in the area of the bearing point, particularly because axial movements also take place, with the effect that exact clamping of the workpiece to be machined can no longer be guaranteed. In addition, this power-operated chuck of prior art only possess as low level of rotary rigidity because of the linear support for the articulation lever, which means the clamping jaws often spring back away from the clamped workpiece. As a result, this hold-down chuck does not satisfy the requirements placed on it in many cases.

The purpose of the present invention is therefore to configure a power-operated chuck of the aforementioned kind in such a way that not only precise clamping of workpieces is achieved over a long time with a high level of rigidity at all times, but that wear is also largely excluded. Above all, however, the objective is to provide the power-operated chuck with a high level of rotary rigidity so that it can be used in a wide range of applications. Furthermore, the power-operated chuck configured in accordance with the proposed invention should be practically maintenance-free and have a long service life.

In accordance with the present invention, this is achieved in the power-operated chuck of the aforementioned kind in that each of the articulation levers is mounted in a swiveling arrangement on articulation pins that pass through them, that the articulation pins are supported in the chuck body so that they cannot rotate and are guided to permit limited axial movement and that each of the articulation pins that passes through the articulation levers has a centrally arranged cylindrical bearing surface for the articulation lever and contact surfaces in both end areas directed in parallel to the bearing surface in order to provide support without rotation and to limit the axial adjustment travel, in which case these surfaces act in conjunction with counter surfaces provided on the chuck body, with the cylindrical bearing surface and the contact surfaces arranged on both sides of the bearing surface each extending along about one third of the axial length of the articulation pin.

The contact surfaces for rotationally fixed support of the articulation pins are, in an advantageous embodiment, worked onto the articulation pins on the sides facing the lengthways axis and/or the outer jacket surface of the chuck body, whereas the contact surfaces for limiting the axial adjustment travel of the articulation pins are located on the articulation pin surfaces faxing the driving jaws, in which case each of the contact surfaces provided on the articulation pins should be arranged at right angles to one another.

The offset of the contact surfaces in relation to the cylindrical bearing surface for limiting the axial adjustment travel should correspond to the hold-down travel given for the power-operated chuck.

However, it is also possible for the specified hold-down travel of the power-operated chuck to be determined by openings to be worked into the chuck body in the area of the free ends of the articulation pins in the surfaces facing the end surface of the chuck body and/or by the offset of the contact surfaces of the articulation pins in relation to the cylindrical bearing surface.

In order for the articulation pin to be supported without any rotation, the chuck body should be provided with one or two counter surfaces facing the contact surfaces in the area of the opening that accommodates the articulation pins. Also, the chuck body in the area of each opening for accommodating the articulation pins (10) should have a counter surface running axially and facing the end of the chuck body as a contact for the articulation pins in the clamped position.

In order to increased the maintenance-free properties, furthermore, the passages in the articulation levers, in the adjustment piston and in any other components of the power-operated chuck in contact with one another should be provided with a liquid-tight seal by means of inserted seals.

If a power-operated chuck is configured in accordance with the present invention, it is guaranteed that workpieces can always be clamped exactly and, because wear on the adjustable components can be practically excluded, also over a long period. The mounting of the articulation levers on the articulation pins that can be moved axially to a limited extent namely makes it possible to achieve a rotationally fixed support in the chuck body, with the effect that a high level of rigidity and therefore also repeat accuracy can be achieved, in particular when changing from one workpiece clamping to another.

Furthermore, the power-operated chuck configured in accordance with the proposed invention has a compact design and is reliably protected against contamination because all penetrations are sealed. Also, because a high level of concentric accuracy is guaranteed at all time in conjunction with straightforward handling, a wide variety of applications can be achieved without difficulty.

Figure 4:
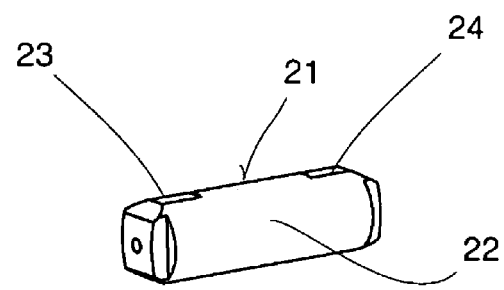
Figure 4:
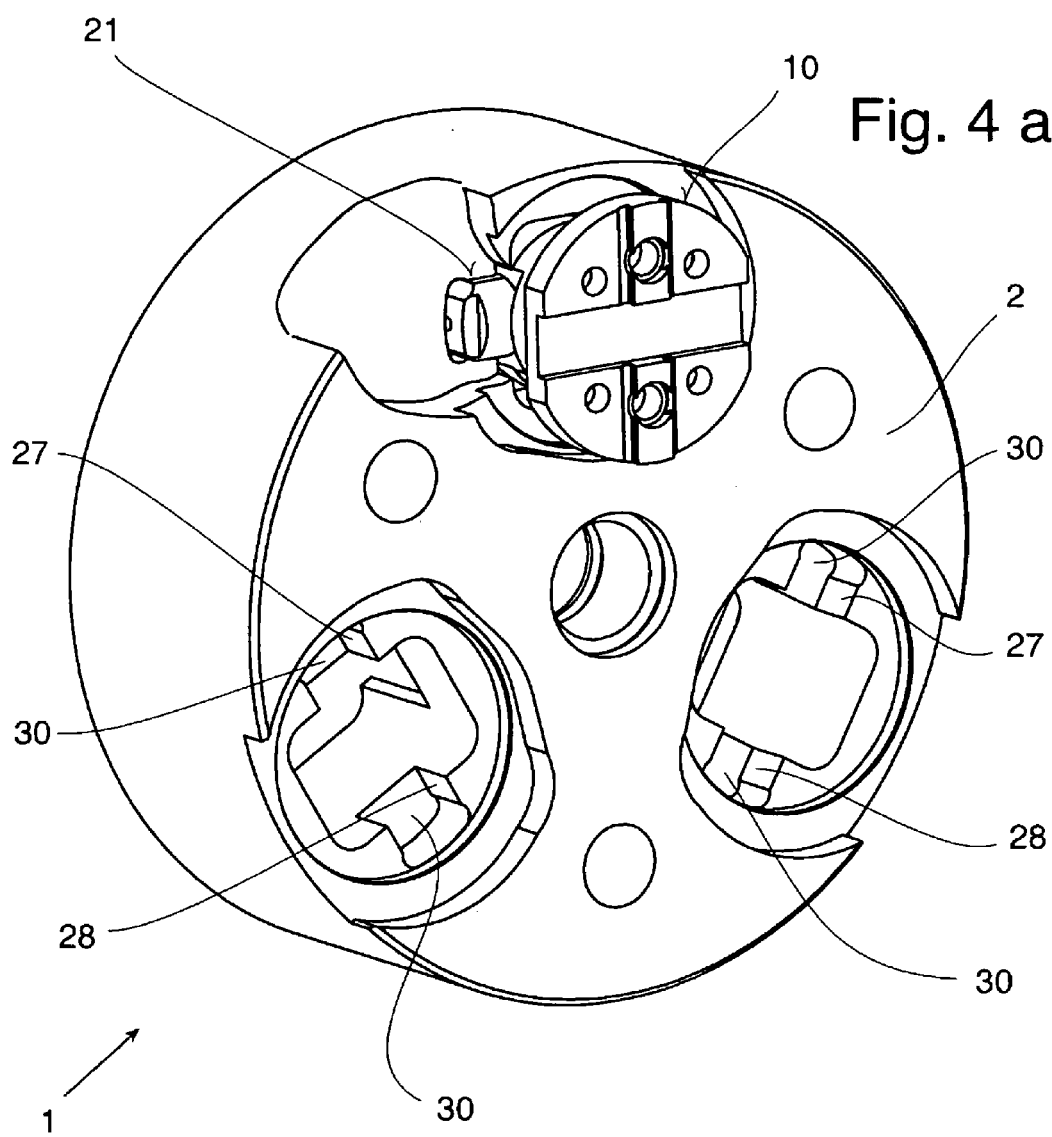
Figure 5:
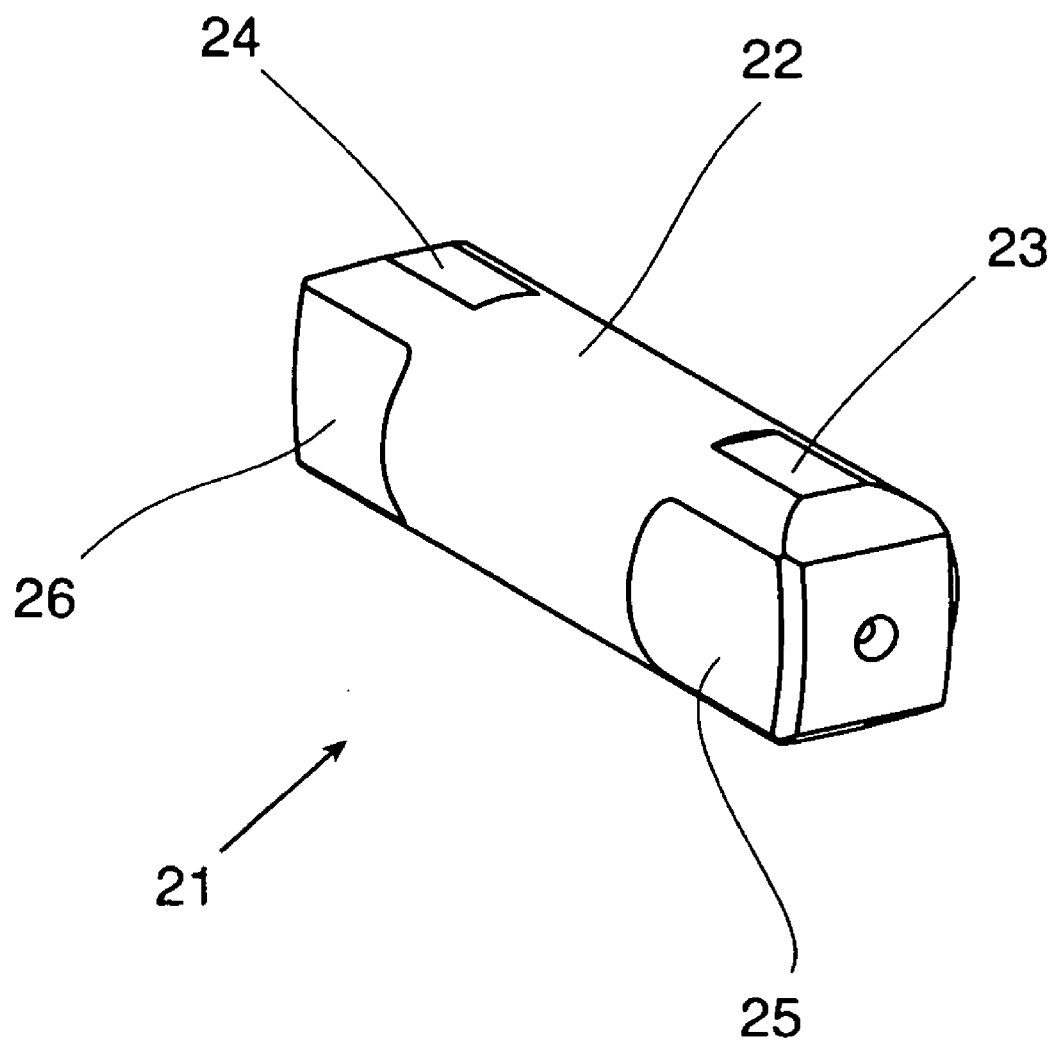

The drawing shows a power-operated chuck configured in accordance with the present invention, the details of which are explained below. In the drawing, FIG. 1 shows the power-operated chuck in an axial section, FIGS. 2 and 3 shows the power-operated chuck in accordance with FIG. 1, in partial sections and different operating positions, FIG. 4*a* shows the chuck body of the power-operated chuck in accordance with FIG. 1 with an inserted articulation level, in a perspective view, FIG. 4*b* shows the articulation pin installed in the articulation lever in accordance with FIG. 4*a* in and individual view and FIG. 5 shows the articulation pin in accordance with FIG. 4*a* in a magnified perspective view.

The power-operated chuck shown in FIGS. 1 to 3 and identified with 1, which is also designated as a hold-down chuck, is used for precise clamping of workpieces W which make face contact during machining and can be clamped by means of radially adjustable clamping jaws 5. The power-operated chuck 1 in this case principally consists of a chuck body 2 which is sealed at the back by a flange 3 and in which openings 4 corresponding to the number of clamping jaws 5 are worked for accommodating articulation levers 10 to which the clamping jaws 5 are attached in an exchangeable arrangement. The swiveling of the articulation levers 10 about an axis S cause the clamping jaws 5 to be closed in the radial direction for clamping the workpiece W, whereas the clamping jaws 5 are swiveled outwards for releasing the clamping.

In order for the swiveling movements of the articulation levers 10 to be performed, an axially moveable adjustment piston 6 is provided that is equipped with wedge hooks 7 and is in a driveable connection with the driving jaws 8 which engage in the wedge hooks 7 of the adjustment piston 6 by means of wedge hooks 9 that are worked in. Axial adjustment movements of the adjusting piston 6 therefore causes the articulation lever 10 to swivel about the axis S and the clamping jaws 5 are moved radially inwards or outwards.

To ensure that exact machining of a clamped workpiece W achieved, the chuck body 2 is provided with a contact surface 17 that is formed by a replaceable stop ring 16. Before the workpiece W is clamped, it is drawn against the contact surface 17 by means of the clamping jaws 5 that can be adjusted axially to a slight extent for this purpose.

In order to make this possible, the ends of the articulation lever 10 facing away from the clamping jaws 5 each engage in a bush 13 that is provided with inclined angled surfaces 14. Also, the articulation levers 10 are provided with assigned angled surfaces 15 so that a radial movement of the driving jaws 8 and, with them, also of the bushes 13, causes an axial movement of the articulation levers 10 to the left, with the effect that the clamping jaws 5 exert an axial force on the workpiece W in the direction of the contact surface 17. In order for the articulation levers 10 to be moved back when the power-operated chuck 1 is opened, a pressure piece 11 is provided upon which a compression spring 12 acts and that is supported on the flange 3.

Articulation pins 21 are provided to permit swiveling and limited axial movement whilst nevertheless achieving rotationally rigid mounting of the articulation levers 10 in the chuck body 2, these articulation pins 21 passing through holes 31 worked into the articulation levers 10 and having cylindrical bearing surfaces 22 on which the articulation levers 10 are supported. Furthermore, the articulation pins 21, as can be seen in particular in FIG. 5, are equipped with contact surfaces 23 and 24 on two opposite ends which are in contact with counter surfaces 27 and 28 worked onto the chuck body 2. This means the articulation pins 21 are held in a rotationally rigid arrangement in the chuck body 2.

Additional contact surfaces 25 and 26 are worked onto the sides of the articulation pins 10 facing the driving jaws 8 perpendicular to the contact surfaces 23 and 24, and the contact surfaces 25 and 26 interact with counter surfaces 29 and 30 provided on the chuck body 2. The offset of the contact surfaces 25 and 26 of the articulation pins 21 in relation to the cylindrical bearing surface 22 corresponds to the axial distance by which articulation levers 10 and therefore also the clamping jaws 5 are moved axially in the direction of the adjustment piston 6 during an actual clamping procedure. However, it is also possible for the contact surfaces 29 and 30 provided in the chuck body to be recessed by the specified hold-down path with having corresponding contact surfaces provided on the articulation pin 21. It goes without saying that both possibilities can also be combined with one another.

FIG. 2 shows the power-operated chuck 1 in the open operating position. The articulation pins 21 in this case are in contact with covers 18 by means of steps, with the covers 18 sealing the openings 4. Therefore, a gap is formed between the contact surfaces 25 and 26 of the articulation pins 21 and the counter surfaces 29 and 30 of the chuck body 2, with this gap corresponding to the axial adjustment distance by means of which the articulation pins 21 must be moved prior to the clamping procedure.

FIG. 3 shows the power-operated chuck 1 in the clamped position. The contact surfaces 25 and 26 are supported against the counter surfaces 29 and 30 in this operating position. Once again, a gap is formed between the cover 18 and the articulation pin 21 corresponding to the offset between the contact surfaces 26 and 27 and the cylindrical bearing surface 22, which is therefore the axial adjustment travel.

The support for the articulation levers 10 by means of these articulation pins 21 that pass through therefore creates a hold-down chuck that is almost maintenance-free because the penetrations 4 of the articulation levers 10 in the covers 18 as well as the adjustment piston 6 are provided with a fluid-tight seal by means of seals 19 or 20 and 20', and that a compact construction is achieved together with a high level of durability and repeat accuracy whilst always guaranteeing precise clamping of the workpiece W.

What is claimed is:

1. A power-operated chuck (1) having at least two radially adjustable clamping jaws (5), each of which is attached to an articulation lever (10) that is axially adjustable against a force of a spring (12) and which is mounted in a chuck body (2) and can swivel, the articulation levers (10) being actuatable by driving jaws (8) acting on ends of the articulation levers (10) opposite to the clamping jaws (5), with the driving jaws (8) being acted upon by a piston (6) by means of inclined surfaces (7 or 9), the chuck body (2) having a contact surface for the workpiece (W) to be clamped, wherein each of the articulation levers (10) is mounted in a swiveling arrangement on articulation pins (21) that pass therethrough, the articulation pins (21) being supported in the chuck body (2) non-rotatably and guided to permit limited axial movement, and each of the articulation pins (21) that passes through the articulation levers (10) is provided with a centrally arranged cylindrical bearing surface (22) for engagement with the articulation levers (10), and contact surfaces (23, 24 or 25, 26) in end areas provide support without rotation in the lever (10) and limit the axial travel, wherein the contact surfaces (23, 24 or 25, 26) act in conjunction with counter surfaces (27, 28 or 29, 30) provided on the chuck body (2).

2. The power-operated chuck in accordance with claim 1, wherein the cylindrical bearing surface (22) and the contact surfaces (23, 24, 25, 26) extend along the axial length of the articulation pin (21).

3. The power-operated chuck in accordance with claim 2, wherein the contact surfaces (23, 24) disposed on the articulation pins (21) face a selected one of a lengthways axis and an outer jacket surface of the chuck body (2).

4. The power-operated chuck in accordance with claim 1, wherein the contact surfaces (25, 26) for limiting axial adjustment travel of the articulation pins (21) are located on articulation pin (21) surfaces facing the driving jaws (8).

5. The power-operated chuck in accordance with claim 3 wherein each of the contact surfaces (23, 24) provided on the articulation pins (21) are arranged at right angles to the other contact surfaces (25, 26) on the pins.

6. The power-operated chuck in accordance with claim 5, wherein an offset of the contact surfaces (25, 26) in relation to the cylindrical bearing surface (22) for limiting axial adjustment travel corresponds to hold-down travel given for the power-operated chuck (1).

7. The power-operated chuck in accordance with claim 6, wherein the hold-down travel of the power-operated chuck (1) is determined by at least one of openings in the chuck body (2) in area of free ends of the articulation pins (21) in the surfaces facing an end surface of the chuck body (2), and offset of the contact surfaces (25, 26) of the articulation pins (21) in relation to the cylindrical bearing surface (22).

8. The power-operated chuck in accordance with claim 7, wherein the counter surfaces 27, 28) face the contact surfaces (23, 24) in an area of an opening (4) that accommodates the articulation pins (21).

9. The power-operated chuck in accordance with claim 8, wherein the chuck body (2) in the area of each opening (4) for accommodating the articulation pins (21) is provided with a counter surface (29, 30) running axially and facing an end of the chuck body (2) as a contact for the articulation pins (21) in the clamped position.

10. The power-operated chuck (1) in accordance with claim 9, wherein passages in the articulation levers (10), in the piston (6), and in other components of the power-operated chuck (1) in contact with one another are provided with a liquid-tight seal (19, 20, 20').

* * * * *